(12) United States Patent
d'Alencon

(10) Patent No.: US 6,205,811 B1
(45) Date of Patent: Mar. 27, 2001

(54) DEVICE FOR MODIFYING THE TEMPERATURE OF A FLUID

(75) Inventor: Marc d'Alencon, Auxerre (FR)

(73) Assignee: TEFA, Saint-Florentin (FR)

( * ) Notice: Subject to any disclaimer, the term of this patent is extended or adjusted under 35 U.S.C. 154(b) by 0 days.

(21) Appl. No.: 09/380,180

(22) PCT Filed: Feb. 26, 1998

(86) PCT No.: PCT/FR98/00375

§ 371 Date: Aug. 26, 1999

§ 102(e) Date: Aug. 26, 1999

(87) PCT Pub. No.: WO98/38464

PCT Pub. Date: Sep. 3, 1998

(30) Foreign Application Priority Data

Feb. 26, 1997 (FR) .................................................. 97 02285

(51) Int. Cl.⁷ .................................................. F25B 1/00
(52) U.S. Cl. .................. 62/498; 62/185; 62/201; 62/325; 62/430; 62/435
(58) Field of Search ........................... 62/498, 430, 434, 62/435, 436, 201, 325, 324.1, 324.6, 185

(56) References Cited

U.S. PATENT DOCUMENTS

| | | | |
|---|---|---|---|
| 2,472,243 | 6/1949 | Berryman | 62/129 |
| 3,139,924 | 7/1964 | Schreiner | 165/29 |
| 4,313,311 | 2/1982 | McCord | 62/197 |
| 4,510,762 | 4/1985 | Richarts | 62/79 |
| 5,038,850 | * 8/1991 | Choi | 165/10 |
| 5,181,552 | 1/1993 | Eiermann | 165/21 |
| 5,826,443 | * 10/1998 | Ares et al. | 62/324.1 |
| 5,884,493 | * 3/1999 | Karstrom et al. | 62/99 |

FOREIGN PATENT DOCUMENTS

| | | |
|---|---|---|
| 3142455 | 5/1983 | (DE) . |
| 3819535 | 12/1988 | (DE) . |
| 0 143 855 | 12/1985 | (EP) . |
| 1 166 159 | 11/1958 | (FR) . |
| 2 280 039 | 2/1976 | (FR) . |
| 1 500 152 | 2/1978 | (GB) . |
| 1 500 351 | 8/1979 | (GB) . |

* cited by examiner

*Primary Examiner*—Corrine McDermott
*Assistant Examiner*—Marc Norman
(74) *Attorney, Agent, or Firm*—Greer, Burns & Crain, Ltd

(57) ABSTRACT

A used fluid passes through an exchange path, located in a fluid flow transfer, before returning to use at a required temperature. In the transfer path the exchange path is set between the evaporator and the condenser of a refrigerating circuit. The refrigerating circuit is actuated only when the temperature of the transfer fluid, consisting for example of ambient air, is unsuitable for properly modifying the used fluid temperature by means of the exchange path. The used fluid can be heated by simply reversing the direction of the flow in the transfer path. The invention is useful for rearranging exchange paths into a single transfer path, for example in a single bundle of tubes arranged in several tube layers of suitably connected tubes.

87 Claims, 2 Drawing Sheets

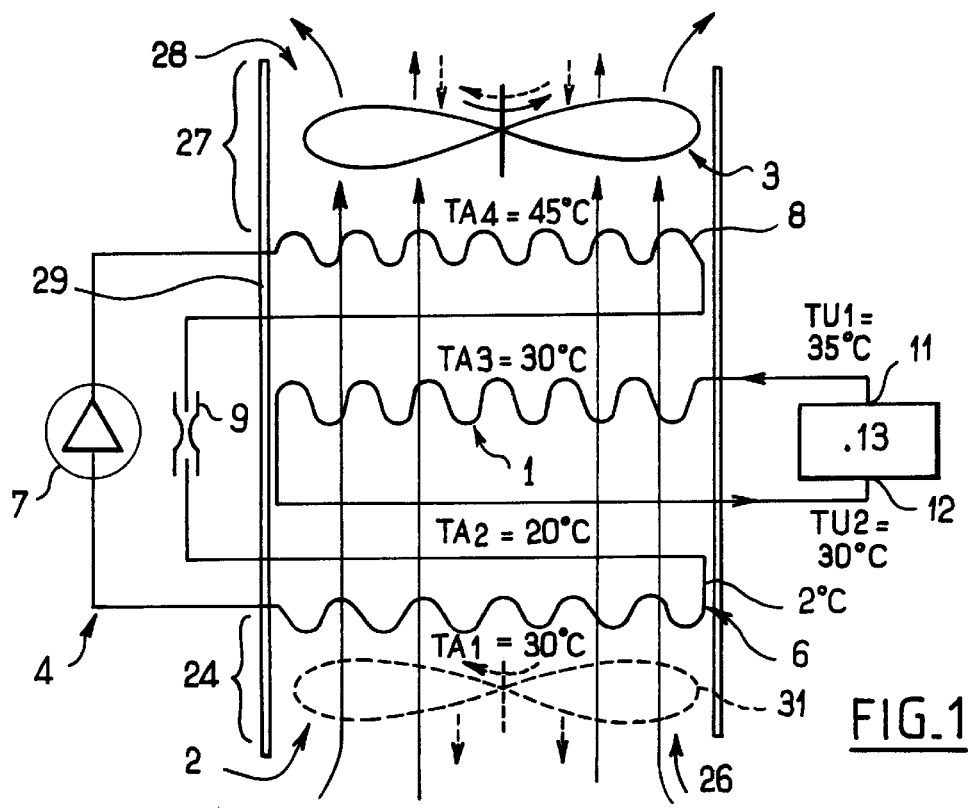
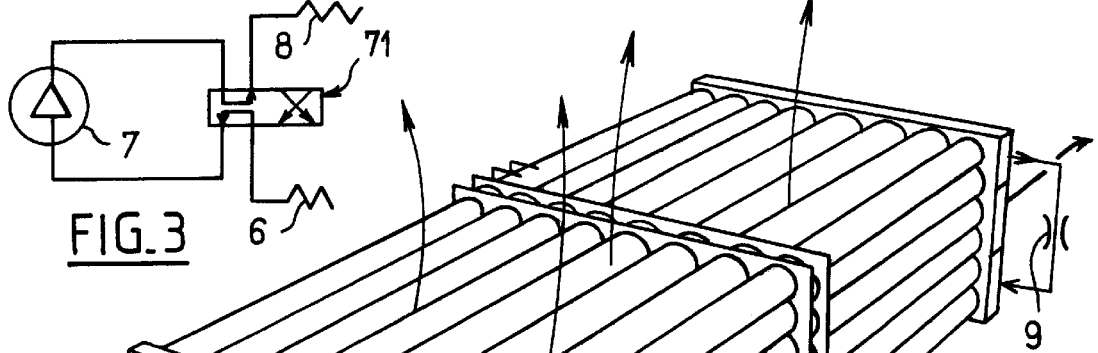
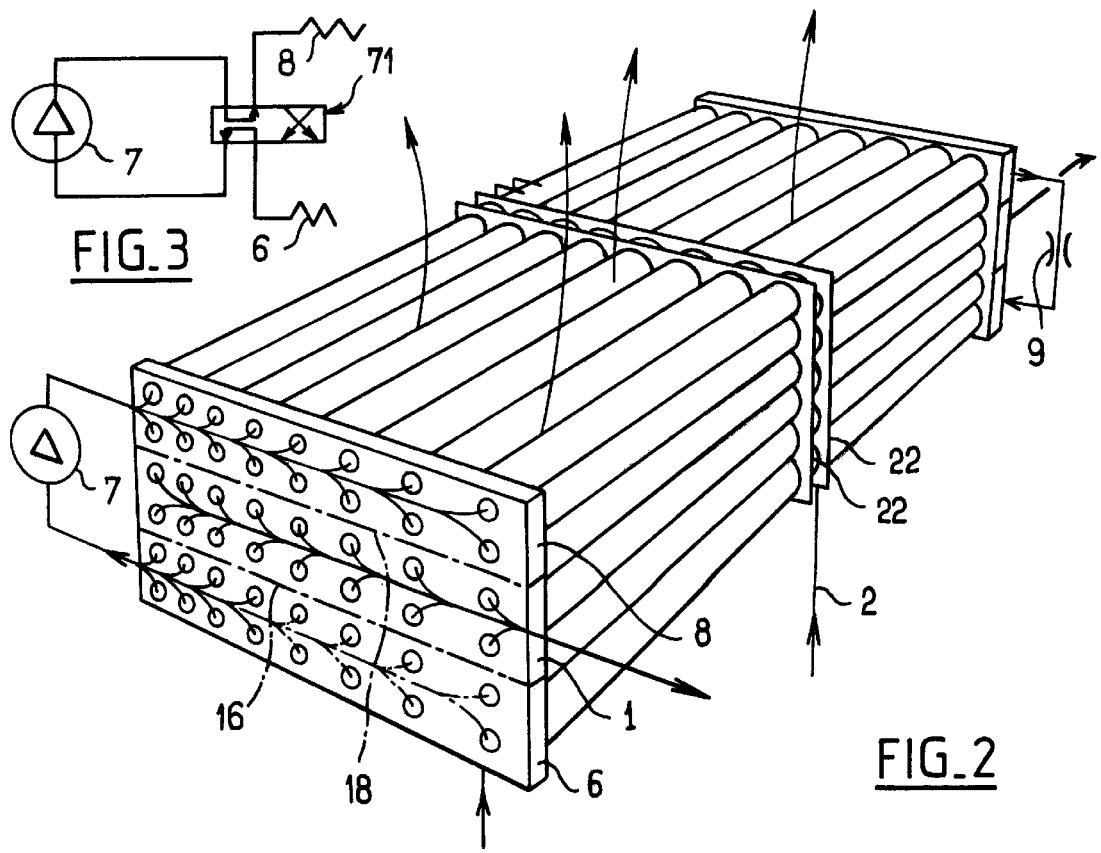

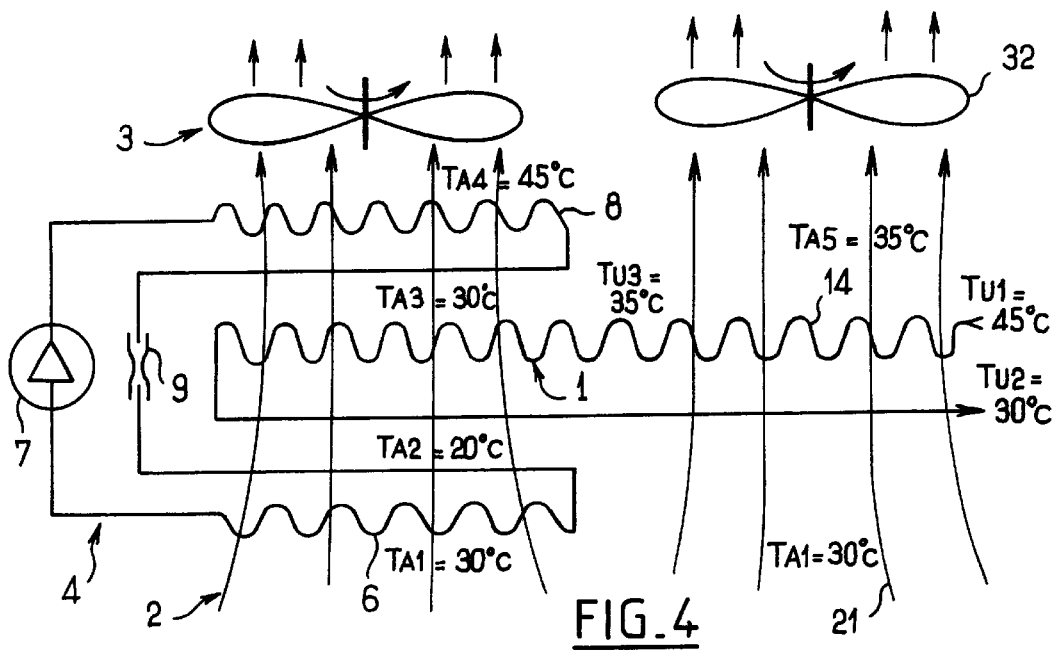
FIG. 4
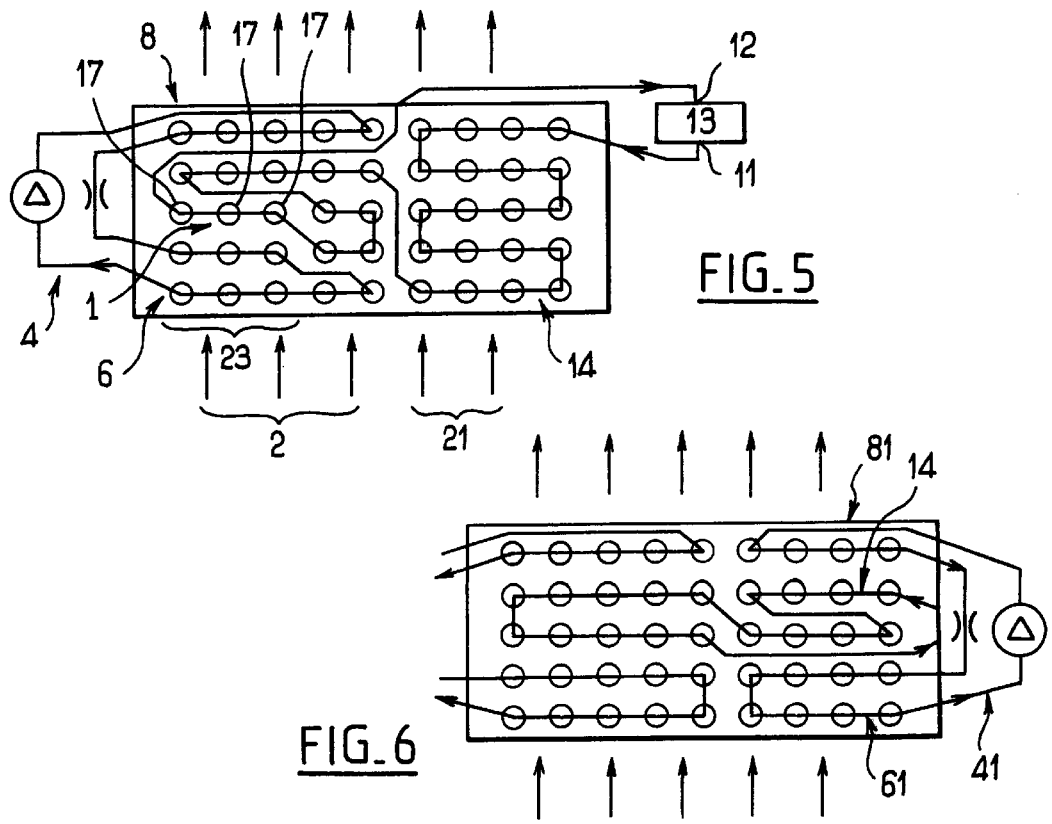
FIG. 5
FIG. 6

DEVICE FOR MODIFYING THE TEMPERATURE OF A FLUID

The present invention relates to a device for modifying the temperature of a working medium.

There is a requirement, in industry, to impart a moderate temperature, that is to say of the order of magnitude of ambient temperatures, to a working medium. The need is, for example, for maintaining a liquid or gaseous working medium at a defined temperature, even though this medium is otherwise participating elsewhere in at least one procedure that tends to move it away from this required temperature. Such situations are encountered, for example, in the context of agricultural food production or even in the case of air-conditioning mediums, for example within compartments enclosing electrical or electronic installations. It is often possible to carry out the regulation in a very economical way as far as energy is concerned by thermal exchange with the atmosphere by means of a device known as an "air-cooler" tower. However, the temperature of the atmosphere varies very greatly depending on climatic conditions. In the frequent situation where it is necessary to cool the working medium, this is no longer possible when the ambient temperature is higher than the set temperature. Likewise, in an application where the working medium might need to be heated up, this is no longer possible when the atmospheric temperature is below the set temperature. In order to remedy this drawback, it is known to cool the air by evaporating off some of the working medium (water, in general) or an ancillary medium before carrying out the thermal exchange by convection between the air and working medium. This method is space-consuming, produces a plume of vapor and mineral deposits in the apparatus. When it is the working medium that is evaporated, it therefore circulates in an open circuit, with risks of bacterial contamination and of fouling.

It is also known to have the working medium pass along another exchange path where the working medium is subjected to the action of a refrigeration unit. The refrigeration unit is put into operation only when the atmospheric temperature is inappropriate for allowing the thermal exchange between the working medium and the ambient air to bring the working medium to the set temperature. However, this solution increases the losses of pressure head and the risks of leakage affecting the working medium circuit. In order to reduce the losses of pressure head, a valve may be provided to bypass the refrigeration exchanger when the refrigeration circuit is out of use, but that further increases the structural and control complexity, as well as the risks of leakage.

A device is known, furthermore, from EP-A-0 143 855, in which the working medium is incoming air which is reheated by the heat recovered from the outgoing air, via a transfer medium. In order to supplement the heat imparted to the incoming air, the transfer medium, on its path towards the exchanger with the incoming air, takes heat from the condenser of a refrigeration machine and, on its return path back to the exchanger with the outgoing air, is re-cooled by contact with the evaporator of the same refrigeration machine. Such a machine here again has the aim of thermal optimization but at the expense of great technical complexity.

The aim of the present invention is to remedy these drawbacks by proposing a device that makes it possible to modify the temperature of a working medium, which is at the same time less space-consuming, more economical and more reliable than the known devices.

According to the invention, a device for modifying the temperature of a working medium, comprising:

a first heat exchange path traversed by the working medium and installed in a thermal exchange relationship with a transfer path traversed by a transfer medium; and a refrigeration circuit comprising a second and a third heat-exchange path for a refrigeration medium, one having a function of heat absorption by the refrigeration circuit and the other a function of heat release by the refrigeration circuit, at least at certain stages of operation, one of the second and third exchange paths being installed in a thermal exchange relationship with the transfer path upstream of the first exchange path, in such a way that the temperature of the transfer medium is modified by heat exchange with the refrigeration medium before the thermal exchange between the transfer medium and the working medium traversing the first exchange path, is characterized in that the transfer path is an open path having, upstream of the exchange paths, an inlet path in which the temperature conditions are substantially independent of the conditions of operation of the device.

Particularly when the temperature of the incoming transfer medium, such as ambient air, is inappropriate for the exchange with the transfer medium to bring the working medium to the desired temperature, the temperature of the transfer medium is first modified by virtue of the refrigeration circuit.

Hence a simple, compact and particularly reliable construction is achieved, particularly as regards risks of leakage, fouling and bacterial contamination. The man skilled in the art is led away from the solution according to the present invention because the efficiency of thermal exchange between the working medium and the refrigeration medium via the transfer medium is unfavorable by reason of the multiple interfaces between these mediums. However, it has been found according to the present invention that this drawback is more than compensated by the advantages set out above, particularly in the preferred applications where the refrigeration circuit is put into operation only in cases of relatively infrequent climatic conditions.

The construction according to the present invention is fundamentally distinguished from that according to EP 0 143 855 where the transfer medium circulates in closed loop and where the refrigeration machine has the essential function of creating a difference between the average temperature in the exchanger with the incoming air and that in the exchanger for recovering heat from the outgoing air.

Preferably, at least one of the inlet and outlet paths can be connected to a store of transfer medium belonging to the environment.

The transfer medium is preferably atmospheric air or the ambient air of the premises. It may also be seawater, lake water, river water or pond water, or even a waste medium such as fumes.

Typically, the input temperature of the transfer medium is not controlled or is poorly controlled, and little or no concern is devoted to the temperature at which the transfer medium is expelled at the other end of the transfer path.

Preferably, the first exchange path is installed in the transfer path in series between the second and the third exchange paths.

Hence, the three exchange paths, consisting for example of banks of tubes, are situated one after the other on the same path of a transfer medium which may be air taken up from the external atmosphere, the internal atmosphere of the premises, seawater, lake or river water, etc. This transfer medium is first cooled by the evaporator of the refrigeration unit, then heated by the first exchange path which is that traveled by the working medium, then again further heated by the condenser of the refrigeration unit. The observation which is the basis of this embodiment of the invention is that the temperature of the transfer medium after being heated up by the first exchange path is approximately the same as that of the atmospheric air or other transfer medium entering the device according to the present invention. Hence, the condenser undergoes the same cooling effect from the transfer medium as if a separate flow of transfer medium were impinging directly on the condenser. This version of the invention thus makes it possible to dispense with a second transfer medium path, with a means such as a motor-driven fan for impelling the transfer medium in this second transfer path, as well as with the energy for operating this motor-driven fan. Moreover, as the three thermal exchange paths may be mounted one behind the other on the transfer path which is common to them all, the construction is at once simpler and more compact.

The device according to the invention may also consist of a heating device in which the transfer medium passes first into contact with the refrigeration condenser then into contact with the first exchange path conducting the working medium. The transfer medium cooled by contact with the first thermal exchange path then passes into contact with the refrigeration evaporator which cools it even further. The refrigeration circuit then operates as a heat pump.

An improved version of the present invention, provides for reversing the direction of flow of the transfer medium. Hence, one of the directions of flow, going from the evaporator to the condenser, serves to cool the working medium while the other direction of flow, from the condenser to the evaporator, serves to heat up the working medium. This simple reversal is sufficient to cause the refrigeration unit to operate as a refrigerator or, conversely, as a heat pump. The reversal of the direction of flow of the transfer medium may be achieved by reversing the direction of rotation of a motor-driven fan for driving the transfer medium, or by selective starting of one or other of two motor-driven fans adapted to produce opposite directions of flow.

In order to make the refrigeration circuit operate selectively as refrigerator or, conversely in heat pump mode, and thus to make the device according to the invention operate selectively for cooling or for heating of the working medium, it is also possible to reverse the direction of flow of the refrigeration medium. The change from one operating mode to the other is achieved by causing a compressor of the refrigeration unit to feed along the exchange path which previously constituted the evaporator and which therefore, from then on, constitutes the condenser, the compressor sucking the refrigerating gas into what now constitutes the evaporator and which previously constituted the condenser. Such selection between the two operating modes is possible by using a system of valves placed at the entry and at the exit of the compressor and which can be manipulated so as to implement, at will, one or other of the two operating modes which have just been described.

It is an advantageous feature of the present invention to set the transfer medium in motion in the transfer path and the working medium in the first exchange path to be able to operate when the refrigeration unit is turned off. It is thus possible to reduce the overall energy consumption by the device and the wear on the refrigeration unit when the temperature of the transfer medium is naturally at a suitable value for bringing the temperature of the working medium to the desired value, by thermal exchange. The refrigeration unit operates, in refrigeration mode or in heat-pump mode, as the case may be and as described above, only if the natural temperature of the transfer medium is inappropriate for modifying or for sufficiently modifying the temperature of the working medium in the desired direction.

It is thus possible to have four operating modes:
cooling of the working medium by the natural temperature of the transfer medium;
heating of the working medium by the natural temperature of the transfer medium;
chilling of the working medium by transfer medium previously cooled by the evaporator of the refrigeration unit;
heating of the working medium by transfer medium previously heated by the condenser of the refrigeration unit.

In the first two cases, regulation is possible by causing the flow speed of the transfer medium to vary. In the second two cases of operation, an on/off or more sophisticated regulation of the refrigeration unit, of known type, can be added in order to cause the thermal power transferred by the refrigeration unit to vary.

An even finer adjustment is possible by providing a refrigeration unit with multiple evaporators, some of which can be de-activated when the cooling requirement is not a maximum, and/or with multiple condensers some of which can be de-activated when the requirement for heating of the transfer medium is not a maximum.

Other features and advantages of the invention will appear further from the following description, relating to non-limiting examples.

In the accompanying drawings:
FIG. 1 is a diagram of a simple embodiment of the invention;
FIG. 2 is a diagrammatic view in perspective of an embodiment of the three exchange paths of the device of FIG. 1;
FIG. 3 is a detailed view of FIG. 1 in a variant embodiment;
FIG. 4 is a view similar to FIG. 1 but relating to another embodiment;
FIG. 5 is an end-view diagram of a bank of tubes for the exchange paths of FIG. 4; and
FIG. 6 is a diagram similar to FIG. 5 but relating to a variant.

In the example shown in FIG. 1, a first heat-exchange path 1 is provided for a working medium, this path being mounted between the outlet 11 and the inlet 12 of an application 13. The application 13 corresponds to a domestic or industrial process which does not form part of the invention. The working medium leaves the application 13 at a temperature $T_{u1}$ which is to be modified in the first exchange path 1 so as to become, at the inlet 12 of the application 13, a temperature $T_{u2}$ which is 30° C. in the non-limiting example described.

The first heat-exchange path 1 is situated in a transfer path 2, in which a transfer medium can be set into motion in the direction represented by the solid-line arrows, by means of a motor-driven fan 3. The working medium flowing in the exchange path 1 is in a thermal exchange relationship with the transfer medium in the transfer path 2. The transfer medium may be ambient air, or another gas, or even a medium consisting of a gaseous mixture (such as ambient air) and liquid, the gaseous part being predominant in terms of percentage by volume, so that the flow preferably has an essentially gaseous character.

There is also in the transfer path 2 a second heat-exchange path 6 and a third heat-exchange path 8 situated respectively upstream and downstream of the first exchange path 1 relative to the direction of flow of the transfer medium on the transfer path 2. The second heat-exchange path 6 constitutes the evaporator of a refrigeration circuit 4. The third exchange path 8 constitutes the condenser of the same refrigeration circuit 4. The circuit 4 further comprises a refrigeration compressor 7 mounted between the outlet of the second exchange path 6 and the inlet of the third exchange path 8 so as to suck in the refrigeration gas from the second exchange path 6 and to deliver it in the compressed state into the third exchange path 8. The refrigeration circuit 4 further comprises an expansion device 9 for expanding the refrigeration medium between the outlet of the third exchange path 8 and the inlet of the second exchange path 6.

The transfer path 2 is an open path exhibiting, upstream of the exchange paths 6, 1, 8, an inlet path 24 commencing with an inlet aperture 26 and, downstream of the exchange paths 6, 1, 8, an outlet path 27 terminating in an outlet aperture 28. The path is open particularly in the sense that the medium arriving at the inlet aperture 26 is not, or in any event is not necessarily, a medium originating directly from the outlet aperture 28. On the contrary, the transfer medium coming into the path 2 has temperature conditions which are independent of the conditions of operation of the device, and in particular of the temperature of the transfer medium on the outlet path 28.

Typically, the orifices 26 and 28 are both connected to the same high-capacity reserve or source, preferably belonging to the environment, such as the outside atmosphere, the ambient air of the premises, a sea, a lake, a river, or else an artificial store such as a pond, or even to two different reserves or sources. In the example represented, the path 2 is defined by a duct 29 open at both its ends. The motor-driven fan 3 is installed in the outlet path 27 to operate as an extractor.

The operation of the device which has just been described is as follows, in the case in which the temperature $T_{u1}$ at which the working medium leaves the application 13 is equal to 35° C.

It is assumed that the temperature of the incoming transfer medium is not controlled, this medium being atmospheric air, for example.

If the natural temperature of the atmospheric air constituting the transfer medium is equal to 20° C., for example, the motor-driven fan 3 is put into operation while keeping the refrigeration circuit 4 out of use. The working medium is cooled from $T_{u1}=35°$ C. to $T_{u2}=30°$ C. by thermal exchange between the atmospheric air at 20° C. and the working medium in the transfer path 2.

If, as represented in FIG. 1, the transfer medium has a natural temperature $T_{A1}=30°$ C., the refrigeration circuit 4 and the motor-driven fan 3 are put into operation simultaneously. The transfer medium is cooled in the first place to a temperature of $T_{A2}=20°$ C. by thermal exchange with the evaporator 6 of the refrigeration circuit 4 then heated to a temperature $T_{A3}=30°$ C. by thermal exchange with the working medium flowing in the first exchange path 1, which makes it possible, as before, to bring the working medium to the desired temperature $T_{u2}=30°$ C. Next, the transfer medium is further heated up to the temperature $T_{A4}=45°$ C. by thermal exchange with the condenser 8 of the refrigeration circuit 4. It is worth noting that the temperatures $T_{A1}$ and $T_{A3}$ are substantially equal. Hence, cooling of the condenser 8 by the medium having been successively cooled then heated up on the path 2 by the second then the first heat-exchange path, is as good as it would have been by any second transfer path provided solely for the condenser 8. The invention thus makes it possible to group together the three exchange paths 6, 1, 8 onto the same transfer path 2 with a single motor-driven fan 3.

FIG. 2 diagrammatically illustrates an embodiment of the three exchange paths in the form of a single bank of tubes, of generally parallelepipedal shape, placed across the path 2. The tubes of the bank are connected with the rest of the device and with the application 13 in such a way that two extreme layers of the bank form, in one instance, the second exchange path 6 and, in the other instance, the third exchange path 8 of the refrigeration circuit while a central layer forms the first exchange path 1. It has also been illustrated in FIG. 2 that the bank of tubes may be of the type provided with fins 22. For clarity in the Figure, only a small number of fins 22 have been represented, but in practice the fins are provided at regular, relatively small intervals, all along the tubes. The fins are metal plates exhibiting perforations into which the metal tubes are crimped so as to make good thermal contact between tubes and fins. Such a bank can be produced using copper tubes having an initial outer diameter allowing the tubes to be freely engaged in the perforations of the fins, and then the tubes are widened by passing a so-called "olive" widening tool through the tubes. The fins increase the surface area in contact with the transfer medium. Moreover, the fins constitute thermal conductors having particularly the effect of directly transferring the heat between the exchange paths of the bank. In particular, the fins directly remove heat from the path 1 towards the path 6 constituting the evaporator. As portrayed by the dots and dashes 16 and 18 in FIG. 2, it is possible, in a variant, to replace the single bank which has just been described by three similar individual banks, stacked one on top of the other in the direction of flow of the transfer medium on the transfer path 2.

If, in contrast to the example referenced in FIG. 1, the outlet temperature $T_{u1}$ from the application 13 is for example, equal to 25° C., that is to say more generally below the temperature $T_{u2}=30°$ C. desired in this example for entry into the application 13, the working medium needs to be heated up instead of cooled down. This can be achieved by reversing the direction of flow on the path 2, which then becomes that represented by the dotted-line arrows of FIG. 1. This reversal can be achieved by reversing the direction of rotation of the motor-driven fan 3 or by putting a second motor-driven fan 31 into service, represented in dotted line in FIG. 1 on the inlet path 24, appropriate for producing a flow in the abovementioned reverse direction. With such a reverse flow, the inlet and outlet paths 24 and 27 assume outlet and inlet functions respectively, the transfer medium is first of all heated up by the condenser 8 to the temperature of 45° C. in the example, then cooled to the temperature of 30° C. by contact with the working medium flowing in the first exchange path 1, then further cooled again by the second exchange path 6 constituting the evaporator. The transfer medium is, in this case, expelled to atmosphere with a final temperature of 20° C., the atmosphere constituting the cold source of the refrigeration circuit 4 then operating as a heat pump.

FIG. 3 portrays another way of making the refrigeration circuit operate as a heat pump capable of heating up the working medium. A four-way valve 71 is situated at the inlet and at the outlet of the compressor 7, between the compressor and, on the one hand, the second thermal exchange path 6 and, on the other hand, the third thermal exchange path 8.

The valve 71, represented diagrammatically, allows the compressor 7 to operate either as was set out above by sucking in from the second exchange path 6 and by delivering into the third exchange path 8, or, conversely, by sucking in from the third exchange path 8 which thus becomes an evaporator and by delivering into the second exchange path 6 which thus becomes a condenser. In this case there is a single motor-driven fan 3 for the path 2 and it does not need to be able to operate in the two directions, since the transfer medium always flows in the same direction along the path 2. When the second exchange path 6 is operating as a condenser, it heats up the transfer medium flowing according to the arrows represented in solid line in FIG. 1, then the transfer medium is capable of heating up the working medium. The refrigeration circuit 4 thus operates, equally in this fashion, as a heat pump.

Obviously, when the refrigeration circuit 4 is out of use, the direction of flow of the transfer medium along the transfer path 2 is of no importance.

In the example represented in FIG. 4, the first exchange path 1 is extended upstream relative to the direction of flow of the working medium by a fourth exchange path 14 which is not situated in the transfer flow 2 bathing the evaporator 6 and the condenser 8 but in a second transfer flow 21 not coming into contact with the second and third exchange paths 6 and 8. Typically, this second transfer flow 21 consists, like the first transfer flow 2, of air taken up from the atmosphere possibly with the addition of drops of liquid such as water. The second flow 21 is set in motion by another motor-driven fan 32 defining a second transfer path parallel to the first transfer path. In order to simplify the figure, the ducts which may be used to channel the transfer flows are not illustrated.

This embodiment is useful when it is necessary to modify the temperature of the working medium by a relatively large amount, for example to bring it from $T_{u1}=45°$ C. to $T_{u2}=30°$ C. In this case, repeating the example of an ambient temperature $T_{A1}=30°$ C., the temperature of the working medium is reduced from 45° C. to $T_{u3}=35°$ C. by thermal exchange with the non-refrigerated transfer flow 21, the refrigerated flow subsequently having only to provide for the working medium to pass from the temperature $T_{u3}=35°$ C. to $T_{u2}=30°$ C. as in the previous example. Thus, there is power spared by the refrigeration circuit.

FIG. 5 illustrates a practical embodiment of a single bank of tubes for all the exchange paths of the embodiment of FIG. 4. In the part situated on the right in FIG. 5, all the tubes of the bank belong to the fourth exchange path 14 followed by the working medium. The transfer flow 21, which passes through this right-hand part of the bank, thus encounters only tubes traversed by working medium which has not yet exchanged heat with the transfer flow 2. The left-hand part of the bank is organized in such a way as to form three successive groups of tubes constituting, in the order in which they are encountered by the transfer flow 2, the evaporator 6, the exchange path 1 and the condenser 8. It is seen that a thermal optimization may lead, to the left in FIG. 1, to a region 23 being created in which each flow stream of the transfer flow 2 encounters more tubes of the evaporator 6 then fewer tubes of the exchange path 1. In the region 23, the streams of the flow 23 are thus more cooled by the evaporator 6. Next, these very much cooled streams encounter the last tubes 17 through which the working medium runs on the path 1 before returning to the application 13. The working medium thus undergoes a supplementary cooling in these latter tubes 17. The tortuous arrows of FIG. 5 indicate the order in which each medium follows the tubes which are allocated to it. In practice, series-parallel connections are possible in order to optimise the implementation in terms of exchange performance, losses of pressure head due to the flow, volume and cost of the bank, etc.

The example of FIG. 6 will be described only as to its differences with respect to that of FIG. 5. The fourth exchange path now occupies only a central group of tubes in the right-hand part of the bank, and it is arranged between a supplementary evaporator 61, situated upstream, and a supplementary condenser 81, situated downstream. The supplementary evaporator 61 and the supplementary condenser 81 belong to a second refrigeration circuit 41, which can be put into operation independently of the circuit 4. For example, putting the circuit 41 into operation can be reserved for exceptional cases in which it is necessary to assist the circuit 4 when the temperature of the working medium is very high at the outlet from the application and/or the ambient temperature is very high.

Obviously, the invention is not limited to the examples described and represented. The exchange paths are not necessarily formed by banks of tubes. The transfer medium may be a medium other than atmospheric air. The working medium may be liquid or gaseous. The implementations of FIGS. 5 and 6 could be modified by, for example, placing two successive evaporators upstream of the exchange path 1 and/or of the exchange path 14. In applications for heating the working medium, several successive condensers could be provided. The refrigerating circuit or circuits may be of a type other than the condensation-evaporation type described. In particular, they could be of the absorption, adsorption, Peltier effect, etc. type.

The transfer path is not necessarily open in immediate proximity to the exchange paths. Conduits or other passages may be necessary to connect at least one of the ends of the transfer path with a high-capacity source or reserve, furnished particularly by the environment.

What is claimed is:

1. A device for modifying a temperature of a working medium, comprising:
    a first heat exchange path traversed by the working medium and installed in a thermal exchange relationship with a transfer path traversed by a transfer medium;
    a refrigeration circuit comprising a second and a third heat-exchange path for a refrigeration medium, one said path having a function of heat absorption by the refrigeration circuit and the other said path having a function of heat release by the refrigeration circuit, at least at certain stages of operation;
    one of the second and third exchange paths is installed in a thermal exchange relationship with the transfer path upstream of the first exchange path in such a way that the temperature of the transfer medium is modified by heat exchange with the refrigeration medium before the thermal exchange between the transfer medium and the working medium traversing the first exchange path; and
    the transfer path is an open path having, upstream of the exchange paths, an inlet path in which the temperature conditions are substantially independent of the conditions of operation of the device.

2. The device according to claim 1, wherein at least one of said inlet path and an outlet path of said transfer paths can be connected to a reserve of transfer medium belonging to the environment.

3. The device according to claim 1, wherein said one of the second and third exchange paths is the one by which the refrigeration circuit absorbs heat.

4. The device according to claim 1, wherein the transfer medium is predominantly gaseous, in terms of percentage by volume.

5. The device according to claim 4, wherein the transfer medium consists predominantly of ambient air, in terms of percentage by volume.

6. The device according to claim 1, further comprising means for causing flow of the working medium in the first exchange path and of the transfer medium in the transfer path while keeping the refrigeration circuit out of action.

7. A device for modifying a temperature of a working medium, comprising:
- a first heat exchange path traversed by the working medium and installed in a thermal exchange relationship with a transfer path traversed by a transfer medium; and
- a refrigeration circuit comprising a second and a third heat-exchange path for a refrigeration medium, one said path having a function of heat absorption by the refrigeration circuit and the other said path having a function of heat release by the refrigeration circuit, at least at certain stages of operation;
- wherein the first exchange path is installed in series between the second and the third exchange paths, relative to a direction of flow of the transfer medium along the transfer path, one of the second and third exchange paths being in a thermal exchange relationship with the transfer path upstream of the first exchange path in such a way that the temperature of the transfer medium is modified by heat exchange with the refrigeration medium before the thermal exchange between the transfer medium and the working medium traversing the first exchange path; and
- the transfer path is an open path having, upstream of the exchange paths, an inlet path in which the temperature conditions are substantially independent of conditions of operation of the device.

8. The device according to claim 7, wherein at least one of said inlet path and an outlet path of the transfer path can be connected to a reserve of transfer medium belonging to an environment.

9. The device according to claim 7, wherein said one of the second and third exchange paths is the path by which the refrigeration circuit absorbs heat.

10. The device according to claim 7, wherein the transfer medium is predominantly gaseous, in terms of percentage by volume.

11. The device according to claim 10, wherein the transfer medium consists predominantly of ambient air, in terms of percentage by volume.

12. The device according to claim 7, wherein with the refrigeration circuit in operation, the temperature of the transfer medium upstream of the three exchange paths and the temperature of the transfer medium at the outlet from the first exchange path are approximately equal.

13. The device according to claim 7, comprising means for reversing the direction of flow of the transfer medium along the transfer path.

14. The device according to claim 7, comprising means for causing flow of the working medium in the first exchange path and of the transfer medium in the transfer path while keeping the refrigeration circuit out of action.

15. The device according to claim 7, wherein at least some of the exchange paths are formed into groups of tubes belonging to a same bank of parallel tubes situated in the transfer path.

16. The device according to claim 7, wherein at least some of said exchange paths are made in the form of banks of tubes, stacked along the direction of flow of the transfer medium along the transfer path.

17. The device according to claim 7, further comprising thermal conducting fins, linking together the exchange paths along the transfer path.

18. The device according to claim 7, further comprising a fourth exchange path for the working medium, situated upstream of the first exchange path relative to the direction of flow of the working medium, wherein the fourth exchange path is situated in a thermal exchange relationship with a second transfer medium path.

19. The device according to claim 18, wherein the second and the third exchange paths are thermally separate from the second transfer path.

20. The device according to claim 18, wherein at least one of the functions of heat absorption and of heat release of the refrigeration circuit is carried out in two stages, one of said heat absorption and said heat release is achieved by a supplementary exchange path situated in a thermal exchange relationship with the second transfer path in series, relative to the flow of the transfer medium, with the fourth exchange path.

21. The device according to claim 7, wherein at least one of the functions of heat absorption and of heat release of the refrigeration circuit is performed in two exchange paths situated in series on the transfer path.

22. A device for modifying a temperature of a working medium, comprising:
- a first heat exchange path traversed by the working medium and installed in a thermal exchange relationship with a transfer path traversed by a transfer medium; and
- a refrigeration circuit comprising a second and a third heat-exchange path for a refrigeration medium, one of said paths having a function of heat absorption by the refrigeration circuit and the other of said paths a function of heat release by the refrigeration circuit, at least at certain stages of operation;
- wherein one of the second and third exchange paths is installed in a thermal exchange relationship with the transfer path upstream of the first exchange path in such a way that the temperature of the transfer medium is modified by heat exchange with the refrigeration medium before the thermal exchange between the transfer medium and the working medium traversing the first exchange path;
- the transfer path is an open path having, upstream of the exchange paths, an inlet path in which the temperature conditions are substantially independent of the conditions of operation of the device; and
- means are provided for reversing flow direction of the transfer medium along the transfer path.

23. The device according to claim 22, wherein at least one of said inlet path and of an outlet path of the transfer path can be connected to a reserve of transfer medium belonging to an environment.

24. The device according to claim 23, further comprising thermal conducting fins, linking together the exchange paths in the transfer path.

25. The device according to claim 22, wherein said one of the second and third exchange paths is the one by which the refrigeration circuit absorbs heat.

26. The device according to claim 22, wherein the transfer medium is predominantly gaseous, in terms of percentage by volume.

27. The device according to claim 26, wherein the transfer medium consists predominantly of ambient air, in terms of percentage by volume.

28. The device according to claim 22, wherein the first exchange path is installed in series between the second and the third exchange paths, relative to the direction of flow of the transfer medium along the transfer path, and wherein with the refrigeration circuit in operation, a temperature of the transfer medium upstream of the three exchange paths and a temperature of the transfer medium at the outlet from the first exchange path are approximately equal.

29. The device according to claim 22, further comprising means for causing flow of the working medium in the first exchange path and of the transfer medium in the transfer path while keeping the refrigeration circuit out of action.

30. The device according to claim 22, wherein at least some of the exchange paths are formed into groups of tubes belonging to a same bank of parallel tubes situated in the transfer path.

31. The device according to claim 22, wherein at least some of said exchange paths are formed into banks of tubes, stacked along the direction of flow of the transfer medium along the transfer path.

32. The device according to claim 22, further comprising a fourth exchange path for the working medium, situated upstream of the first exchange path relative to the direction of flow of the working medium, wherein the fourth exchange path is situated in a thermal exchange relationship with a second transfer medium path.

33. The device according to claim 32, wherein the second and the third exchange paths are thermally separate from the second transfer path.

34. The device according to claim 32, wherein at least one of the functions of heat absorption and of heat release of the refrigeration circuit is carried out in two stages, one of said heat absorption and said heat release is achieved by a supplementary exchange path situated in a thermal exchange relationship with the second transfer path in series, relative to the flow of the transfer medium, with the fourth exchange path.

35. The device according to claim 22, wherein at least one of the functions of heat absorption and of heat release of the refrigeration circuit is performed in two exchange paths situated in series along the transfer path.

36. A device for modifying the temperature of a working medium, comprising:
   a first heat exchange path traversed by the working medium and installed in a thermal exchange relationship with a transfer path traversed by a transfer medium;
   a refrigeration circuit comprising a second and a third heat-exchange path for a refrigeration medium, one said path having a function of heat absorption by the refrigeration circuit and the other said path having a function of heat release by the refrigeration circuit, at least at certain stages of operation;
   wherein one of the second and third exchange paths is installed in a thermal exchange relationship with the transfer path upstream of the first exchange path in such a way that a temperature of the transfer medium is modified by heat exchange with the refrigeration medium before the thermal exchange between the transfer medium and the working medium traversing the first exchange path;
   the transfer path is an open path having, upstream of the exchange paths, an inlet path in which temperature conditions are substantially independent of conditions of operation of the device; and
   at least some of the exchange paths are formed into groups of tubes belonging to a same bank of parallel tubes situated in the transfer path.

37. The device according to claim 36, wherein at least one of said inlet path and an outlet path of the transfer path can be connected to a reserve of transfer medium belonging to the environment.

38. The device according to claim 36, wherein said one of the second and third exchange paths is the one by which the refrigeration circuit absorbs heat.

39. The device according to claim 36, wherein the transfer medium is predominantly gaseous, in terms of percentage by volume.

40. The device according to claim 39, wherein the transfer medium consists predominantly of ambient air, in terms of percentage by volume.

41. The device according to claim 36, wherein the first exchange path is installed in series between the second and the third exchange paths, relative to the direction of flow of the transfer medium along the transfer path, and wherein with the refrigeration circuit in operation, the temperature of the transfer medium upstream of the three exchange paths and the temperature of the transfer medium at the outlet from the first exchange path are approximately equal.

42. The device according to claim 36, comprising means for causing flow of the working medium in the first exchange path and of the transfer medium in the transfer path while keeping the refrigeration circuit out of action.

43. The device according to claim 36, further comprising thermal conducting fins, linking together the exchange paths in the transfer path.

44. The device according to claim 36, further comprising a fourth exchange path for the working medium, situated upstream of the first exchange path relative to the direction of flow of the working medium, wherein the fourth exchange path is situated in a thermal exchange relationship with a second transfer medium path.

45. The device according to claim 44, wherein the second and the third exchange paths are thermally separate from the second transfer path.

46. The device according to claim 44, wherein at least one of the functions of heat absorption and heat release of the refrigeration circuit is carried out in two stages, one of said heat absorption and said heat release is achieved by a supplementary exchange path situated in a thermal exchange relationship with the second transfer path in series, relative to the flow of the transfer medium, with the fourth exchange path.

47. The device according to claim 36, wherein at least one of the functions of heat absorption and of heat release of the refrigeration circuit is performed in two exchange paths situated in series in the transfer path.

48. A device for modifying a temperature of a working medium, comprising:
   a first heat exchange path traversed by the working medium and installed in a thermal exchange relationship with a transfer path traversed by a transfer medium;
   a refrigeration circuit comprising a second and a third heat-exchange path for a refrigeration medium, one said path having a function of heat absorption by the refrigeration circuit and the other said path having a function of heat release by the refrigeration circuit, at least at certain stages of operation;
   wherein one of the second and third exchange paths is installed in a thermal exchange relationship with the transfer path upstream of the first exchange path in such a way that a temperature of the transfer medium is modified by heat exchange with the refrigeration medium before the thermal exchange between the transfer medium and the working medium traversing the first exchange path;

the transfer path is an open path having, upstream of the exchange paths, an inlet path in which a temperature conditions are substantially independent of conditions of operation of the device; and at least some of said exchange paths are formed into banks of tubes, stacked along flow direction of the transfer medium along the transfer path.

49. The device according to claim 48, wherein at least one of said inlet path and an outlet path of the transfer path can be connected to a reserve of transfer medium belonging to an environment.

50. The device according to claim 48, wherein one of said second and third exchange paths is the path by which the refrigeration circuit absorbs heat.

51. The device according to claim 48, wherein the transfer medium is predominantly gaseous, in terms of percentage by volume.

52. The device according to claim 51, wherein the transfer medium consists predominantly of ambient air, in terms of percentage by volume.

53. The device according to claim 48, wherein the first exchange path is installed in series between the second and the third exchange paths, relative to flow direction of the transfer medium along the transfer path, and wherein with the refrigeration circuit in operation, the temperature of the transfer medium upstream of the three exchange paths and the temperature of the transfer medium at the outlet from the first exchange path are approximately equal.

54. The device according to claim 48, further comprising means for causing flow of the working medium in the first exchange path and of the transfer medium in the transfer path while keeping the refrigeration circuit out of action.

55. The device according to claim 48, further comprising thermal conducting fins, linking together the exchange paths in the transfer path.

56. The device according to claim 48, further comprising a fourth exchange path for the working medium, situated upstream of the first exchange path relative to flow direction of the working medium, wherein the fourth exchange path is situated in a thermal exchange relationship with a second transfer medium path.

57. The device according to claim 56, wherein the second and the third exchange paths are thermally separate from the second transfer path.

58. The device according to claim 56, wherein at least one of the functions of heat absorption and heat release of the refrigeration circuit is carried out in two stages, one of said heat absorption and said heat release is achieved by a supplementary exchange path situated in a thermal exchange relationship with the second transfer path in series, relative to the flow of the transfer medium, with the fourth exchange path.

59. The device according to claim 48, wherein at least one of the functions of heat absorption and heat release of the refrigeration circuit is performed in two exchange paths situated in series in the transfer path.

60. A device for modifying temperature of a working medium, comprising:

a first heat exchange path traversed by the working medium and installed in a thermal exchange relationship with a transfer path traversed by a transfer medium;

a refrigeration circuit comprising a second and a third heat-exchange path for a refrigeration medium, one said path having a function of heat absorption by the refrigeration circuit and the other said path having a function of heat release by the refrigeration circuit, at least at certain stages of operation;

one of the second and third exchange paths is installed in a thermal exchange relationship with the transfer path upstream of the first exchange path in such a way that a temperature of the transfer medium is modified by heat exchange with the refrigeration medium before the thermal exchange between the transfer medium and the working medium traversing the first exchange path;

the transfer path is an open path having, upstream of the exchange paths, an inlet path in which temperature conditions are substantially independent of conditions of operation of the device; and thermal conducting fins, link together the exchange paths in the transfer path.

61. The device according to claim 60, wherein at least one of said inlet path and of an outlet path of the transfer path can be connected to a reserve of transfer medium belonging to an environment.

62. The device according to claim 60, wherein one of said second and third exchange paths is the path by which the refrigeration circuit absorbs heat.

63. The device according to claim 60, wherein the transfer medium is predominantly gaseous, in terms of percentage by volume.

64. The device according to claim 60, wherein the transfer medium consists predominantly of ambient air, in terms of percentage by volume.

65. The device according to claim 60, wherein the first exchange path is installed in series between the second and the third exchange paths, relative to flow direction of the transfer medium along the transfer path, and wherein with the refrigeration circuit in operation, a temperature of the transfer medium upstream of the three exchange paths and a temperature of the transfer medium at the outlet from the first exchange path are approximately equal.

66. The device according to claim 60, further comprising means for causing flow of the working medium in the first exchange path and of the transfer medium in the transfer path while keeping the refrigeration circuit out of action.

67. The device according to claim 60, further comprising a fourth exchange path for the working medium, situated upstream of the first exchange path relative to the direction of flow of the working medium, wherein the fourth exchange path is situated in a thermal exchange relationship with a second transfer medium path.

68. The device according to claim 67, wherein the second and the third exchange paths are thermally separate from the second transfer path.

69. The device according to claim 67, wherein at least one of the functions of heat absorption and heat release of the refrigeration circuit is carried out in two stages, one of said heat absorption and said heat release is achieved by a supplementary exchange path situated in a thermal exchange relationship with the second transfer path in series, relative to the flow of the transfer medium, with the fourth exchange path.

70. The device according to claim 60, wherein at least one of the functions of heat absorption and of heat release of the refrigeration circuit is performed in two exchange paths situated in series in the transfer path.

71. A device for modifying a temperature of a working medium, comprising:

a first heat exchange path traversed by the working medium and installed in a thermal exchange relationship with a transfer path traversed by a transfer medium;

a refrigeration circuit comprising a second and a third heat-exchange path for a refrigeration medium, one said path having a function of heat absorption by the refrigeration circuit and the other said path having a function of heat release by the refrigeration circuit, at least at certain stages of operation;

wherein one of the second and third exchange paths is installed in a thermal exchange relationship with the transfer path upstream of the first exchange path in such a way that a temperature of the transfer medium is modified by heat exchange with the refrigeration medium before the thermal exchange between the transfer medium and the working medium traversing the first exchange path;

the transfer path is an open path having, upstream of the exchange paths, an inlet path in which temperature conditions are substantially independent of conditions of operation of the device; and there is provided a fourth exchange path for the working medium, said fourth exchange path situated upstream of the first exchange path relative to the direction of flow of the working medium and in a thermal exchange relationship with a second transfer medium path.

72. The device according to claim 71, wherein at least one of said inlet path and of an outlet path of the transfer path can be connected to a reserve of transfer medium belonging to the environment.

73. The device according to claim 71, wherein said one of the second and third exchange paths is the one by which the refrigeration circuit absorbs heat.

74. The device according to claim 71, wherein the transfer medium is predominantly gaseous, in terms of percentage by volume.

75. The device according to claim 74, wherein the transfer medium consists predominantly of ambient air, in terms of percentage by volume.

76. The device according to claim 71, wherein the first exchange path is installed in series between the second and the third exchange paths, relative to flow direction of the transfer medium along the transfer path, and wherein with the refrigeration circuit in operation, a temperature of the transfer medium upstream of the three exchange paths and a temperature of the transfer medium at the outlet from the first exchange path are approximately equal.

77. The device according to claim 71, comprising means for causing flow of the working medium in the first exchange path and of the transfer medium in the transfer path while keeping the refrigeration circuit out of action.

78. The device according to claim 71, wherein the second and the third exchange paths are thermally separate from the second transfer path.

79. The device according to claim 71, wherein at least one of the functions of heat absorption and heat release of the refrigeration circuit is carried out in two stages, one of said heat absorption and said heat release is achieved by a supplementary exchange path situated in a thermal exchange relationship with the second transfer path in series, relative to the flow of the transfer medium, with the fourth exchange path.

80. The device according to claim 71, wherein at least one of the functions of heat absorption and of heat release of the refrigeration circuit is performed in two exchange paths situated in series in the transfer path.

81. A device for modifying a temperature of a working medium, comprising:

a first heat exchange path traversed by the working medium and installed in a thermal exchange relationship with a transfer path traversed by a transfer medium;

a refrigeration circuit comprising a second and a third heat-exchange path for a refrigeration medium, one said path having a function of heat absorption by the refrigeration circuit and the other said path having a function of heat release by the refrigeration circuit, at least at certain stages of operation;

wherein one of the second and third exchange paths is installed in a thermal exchange relationship with the transfer path upstream of the first exchange path in such a way that a temperature of the transfer medium is modified by heat exchange with the refrigeration medium before the thermal exchange between the transfer medium and the working medium traversing the first exchange path;

the transfer path is an open path having, upstream of the exchange paths, an inlet path in which temperature conditions are substantially independent of the conditions operation of the device; and at least one of the functions of heat absorption and of heat release of the refrigeration circuit is performed in two exchange paths situated in series in the transfer path.

82. The device according to claim 81, wherein at least one of said inlet path and of an outlet path of the transfer path can be connected to a reserve of transfer medium belonging to the environment.

83. The device according to claim 81, wherein said one of the second and third exchange paths is the one by which the refrigeration circuit absorbs heat.

84. The device according to claim 81, wherein the transfer medium is predominantly gaseous, in terms of percentage by volume.

85. The device according to claim 81, wherein the transfer medium consists predominantly of ambient air, in terms of percentage by volume.

86. The device according to claim 81, wherein the first exchange path is installed in series between the second and the third exchange paths, relative to flow direction of the transfer medium along the transfer path, and wherein with the refrigeration circuit in operation, the temperature of the transfer medium upstream of the three exchange paths and the temperature of the transfer medium at the outlet from the first exchange path are approximately equal.

87. The device according to claim 81, comprising means for causing flow of the working medium in the first exchange path and of the transfer medium in the transfer path while keeping the refrigeration circuit out of action.

* * * * *